W. G. ASKEW.
BREAD RAISING AND WARMING CABINET.
APPLICATION FILED JULY 24, 1916.
1,227,103.
Patented May 22, 1917.
2 SHEETS—SHEET 2.
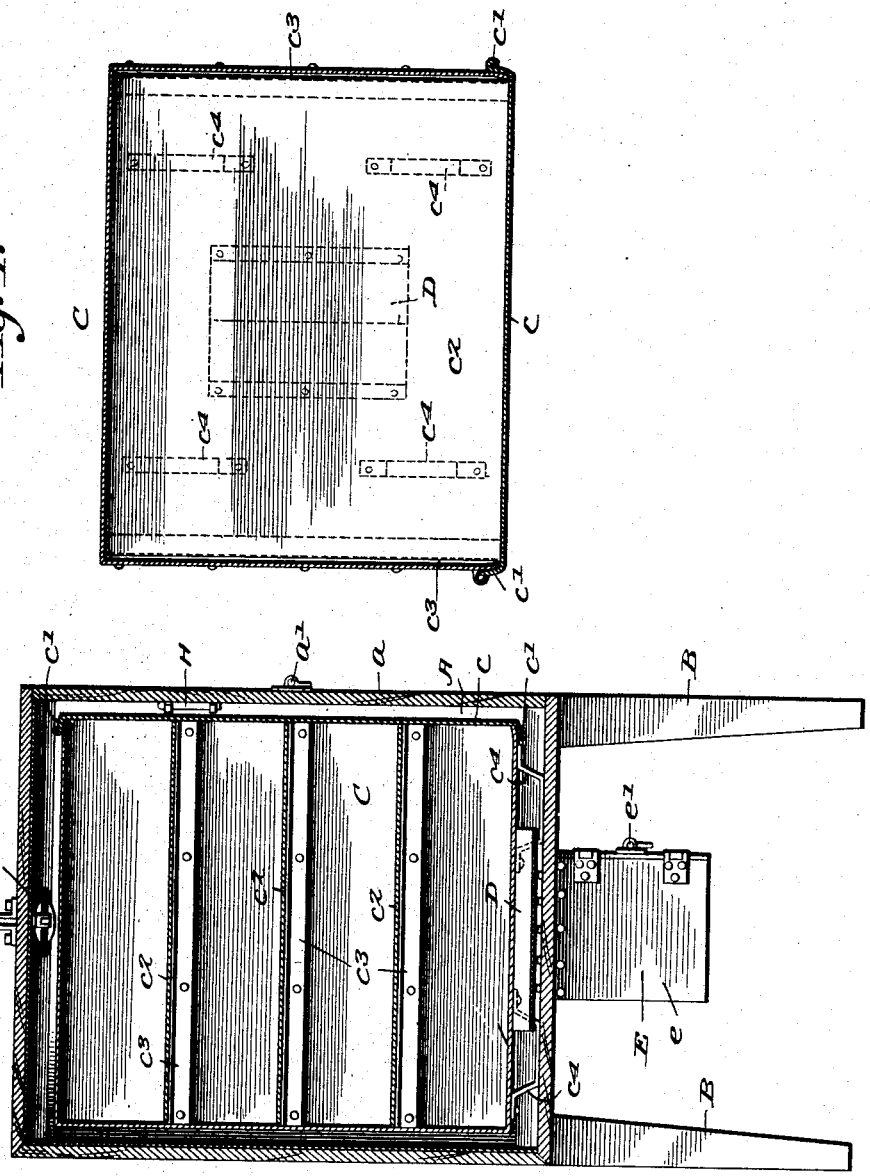

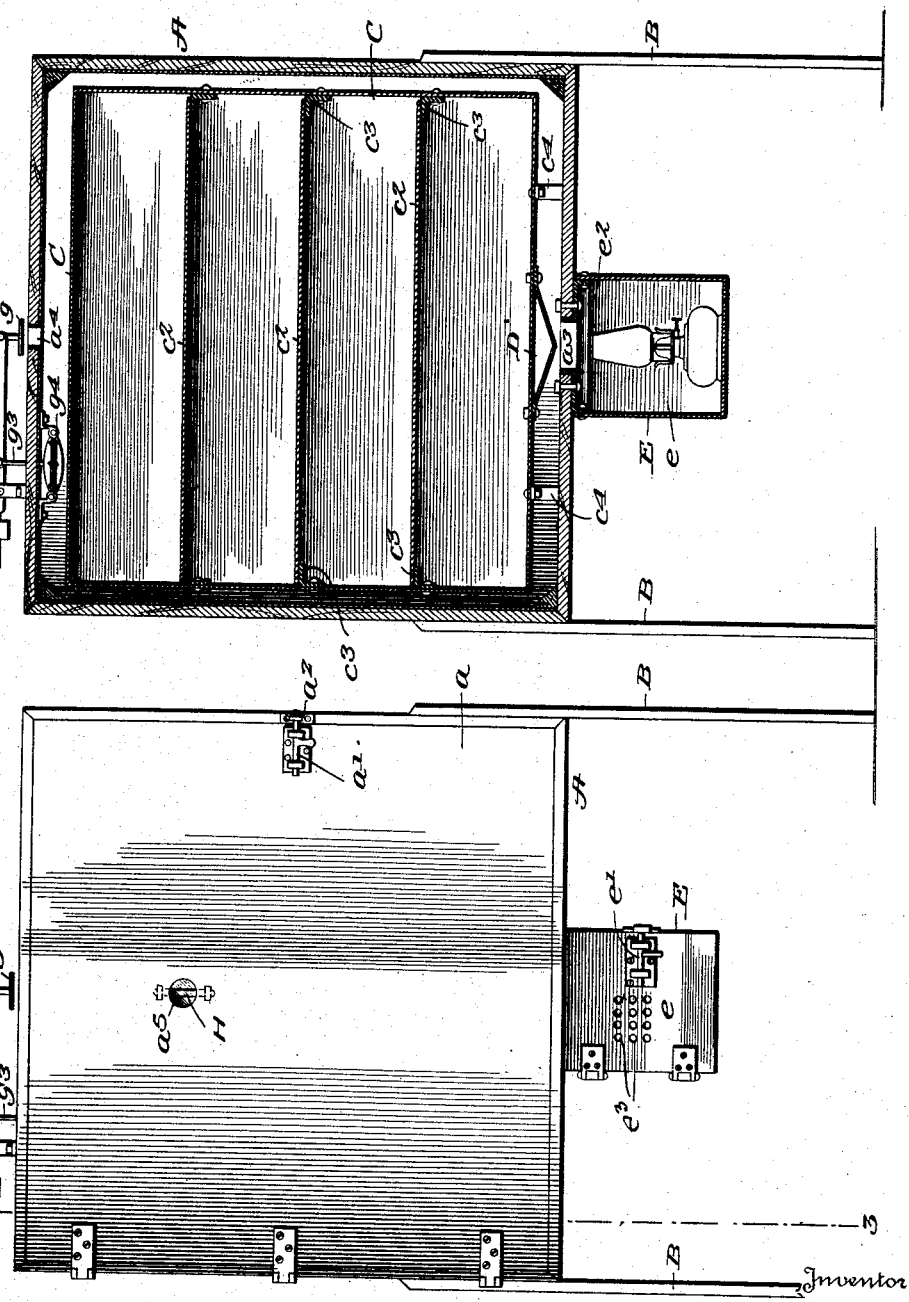

UNITED STATES PATENT OFFICE.

WILIE G. ASKEW, OF MORGAN CITY, LOUISIANA.

BREAD RAISING AND WARMING CABINET.

1,227,103.  Specification of Letters Patent.  Patented May 22, 1917.

Application filed July 24, 1916. Serial No. 110,975.

*To all whom it may concern:*

Be it known that I, WILIE G. ASKEW, a citizen of the United States, residing at Morgan City, in the parish of St. Mary and State of Louisiana, have invented certain new and useful Improvements in Bread Raising and Warming Cabinets; and I do hereby declare the following to be a full, clear, and exact description of the invention, such as will enable others skilled in the art to which it appertains to make and use the same.

This invention relates to apparatus used for warming food, and more particularly to an apparatus of the character referred to especially designed for raising and warming bread and keeping vegetables and various articles of food which have been prepared for the table in a warm condition ready to be served.

The invention will first be hereinafter more particularly described, with reference to the accompanying drawings, which are to be taken as a part of this specification, and then pointed out in the claims at the end of the description.

Figure 1 of said drawings represents a front elevation of my bread raising and warming cabinet;

Fig. 2 is a vertical sectional elevation of the same;

Fig. 3 is a vertical sectional elevation of the same at right angles to the section shown in Fig. 2, the section being taken on the line 3—3 of Fig. 1; and Fig. 4 is a sectional top plan view of the oven or food receptacle which is removably fitted within the outer casing or cabinet.

Referring to said drawings, in which the same reference characters or letters are used to denote corresponding parts in different views, the letter A may denote an outer casing or cabinet proper, preferably made of wood and box-like in form, and having its interior lined with zinc, sheet metal or other suitable material. The cabinet is mounted on legs B, B, adapted to support it at a suitable height above the floor of the room in which it is used, and it is provided with an open front which is closed by a tightly fitting hinged door $a$, having a sliding bolt $a^1$ thereon arranged to engage an eye or staple $a^2$ on the cabinet for holding the door in a closed position. Within the cabinet or outer casing A is placed an oven or food receptacle C which is preferably constructed of sheet metal and in box-like form, and removably supported within the cabinet and spaced therefrom at top, bottom and on all four sides, to permit a free circulation of warm or heated air around the oven or between the same and the metallic lining of the outer casing. The oven C has a hinged door $c$ which is preferably formed of sheet metal and with a marginal flange $c^1$ adapted to overlap the edges of the oven on all four sides so as to grip the same and hold the lid in closed position by frictional contact between the edges of the oven and said marginal flanges. A series of shelves $c^2$ are provided within the oven on which pans containing dough or other articles of food may be placed; said shelves being suitably spaced and supported on brackets $c^3$ which may be bolted or otherwise secured on the inner side of the oven so as to adapt the shelves to be removed for cleansing purposes. To the underside or bottom of the oven may be secured, by bolts or rivets, metal brackets $c^4$ adapted to hold the oven a suitable distance above the bottom of the casing A, and between said brackets is secured a deflector D which may consist of a sheet metal plate having oppositely inclined wings, the edges of which are secured by bolts or rivets to the bottom of the oven so that oppositely inclined surfaces are presented so that the warm or heated air entering through an opening $a^3$ in the bottom of the casing will be divided and distributed in equal portions on opposite sides of the oven, and may pass to and through the spaces between the outer sides of the oven and the inner sides of the casing A to and along the space between the oven top and the inner wall of the casing and escape through an opening $a^4$ in the top of the casing.

To the underside or bottom of the casing A is attached a heating chamber E within which may be placed any suitable heat producing device, such as a lamp or electric heater, by which air entering the chamber E through perforations $e^3$ may be heated and allowed to pass upwardly through the opening $a^3$ in the bottom of the casing A, and from thence through the space between the interior of the casing and the oven, for warming the contents of the oven. The lamp chamber E has an open side which is closed by a door $e$, which is provided with an ordinary sliding bolt or latch $e^1$ for holding it in closed position. The lamp chamber E is preferably constructed of sheet metal with an open top in which is fitted a metallic plate $e^2$ which is bolted to the bottom of the casing A and serves to protect the wooden bottom from the heat within the heating chamber or lamp case. The plate $e^2$ has a marginal flange through which bolts or rivets are inserted for securing it to a lamp chamber, and also a central opening with a marginal flange which enters the opening $a^3$ in the bottom of the cabinet and protects the wood from the heater.

For automatically controlling the escape of heated air and likewise the flow of cool air into the cabinet through the perforations $e^3$, so as to maintain a uniform temperature within the cabinet, a thermostat G, of the form shown, or any desired form, such as is commonly used for heat regulating purposes, may be mounted on the cabinet and adapted by expansion and contraction, under varying degrees of temperature, to open and close a valve $g$ on the end of a lever $g^1$, pivotally mounted on top of the cabinet; said lever having adjustably secured on the threaded shorter arm thereof a counterweight $g^2$, and having a rod $g^3$ pivoted thereto at one end and depending through an opening in the top of the casing and connected with a device $g^4$, within the casing, which is adapted by expansion and contraction to raise and lower said lever when the temperature within the cabinet is raised or lowered. I also preferably attach to the door of the cabinet, on the inner side thereof, a thermometer H which is exposed to view through an opening $a^5$ so that the temperature within the cabinet may be readily ascertained at any time, and the thermostatic device may be adjusted so as to maintain within the cabinet a uniform temperature at all times.

When the temperature within the cabinet rises, the valve $g$ permits the hot air to escape and the resultant circulation within the cabinet allows a flow of cooling air to enter through the perforations $e^3$ in the lamp box, whereupon the temperature becoming lower the valve $g$ closes and shuts off the inflow of cool air and the cabinet heats up again. It will be seen that this cycle of operation is entirely automatic and the cabinet is kept at an even temperature at all times. It will likewise be noted that the heat from the lamp remains constant, but the entrance of cooling air is regulated by the efflux of heated air at the top caused by the opening of the valve.

I thus provide an apparatus of the character referred to which consists of few parts arranged in convenient form for use in keeping bread, meat and other articles of food warm for any desired length of time, so that such articles having been previously prepared for the table may be placed within the oven and kept warm until ready to be served. The apparatus is especially designed and adapted for use in raising bread, by placing pans of dough on the shelves within the oven and lighting the lamp or other heat producing device so as to introduce heated air into the cabinet in such manner that it will circulate around the oven and escape through the opening $a^4$ at the top, when the temperature has risen enough to cause the thermostat to open the valve $g$, and when the temperature is lowered said valve will be automatically closed, and thus a uniform temperature within the cabinet will be maintained. In cold climates, where houses are not kept warm all night, this cabinet can be used to keep fruits, vegetables, eggs and other articles warm throughout the night. The oven is adapted to be readily removed to permit the interior of the cabinet to be cleaned, and the shelves within the oven are also removable for cleansing purposes.

Preferably the door of the cabinet and also the door of the lamp chamber, if desired, may be provided with a blind bolt or device adapted to be opened only by one knowing the combination, so as to prevent children and inquisitive or unauthorized persons from having access to the cabinet or lamp chamber. The door of the lamp chamber or one of its sides is also perforated to admit air to the lamp or combustion chamber.

Having thus described my invention, what I claim as new and desire to secure by Letters Patent of the United States is:

1. A bread raising and warming cabinet comprising an outer casing having an opening in its bottom and an opening in its top, means for heating and introducing heated air in said casing through said bottom opening, means for automatically controlling the escape of air from the casing through said top opening, and a closed food receptacle within the casing spaced therefrom on all sides and at top and bottom to permit air entering through the bottom of the casing to circulate around said receptacle and escape through the opening at the top of the casing.

2. A bread raising and warming cabinet comprising a metallic-lined wooden casing having an air inlet opening in its bottom and an air exit opening at its top, a closed sheet-metal oven within said casing spaced therefrom on all sides and at top and bottom to permit the air to circulate around it and having a series of shelves supported therein, a heat producing device at the bottom of the casing in communication with said inlet, and a thermostat for actuating a valve controlling the escape of air through said exit, whereby a uniform temperature may be maintained within the casing.

3. A bread raising and warming cabinet, comprising a casing and an interior receptacle spaced therefrom; said casing having an exit at its upper part communicating with the space between the casing and receptacle and provided with an inlet at the lower part of the casing and communicating with said space, means for heating said space between the casing and receptacle, and automatic means for introducing cooling air into said space.

4. A bread raising and warming cabinet comprising a casing, a spaced interior receptacle, means for constantly heating said space and thermostatically controlled means for admitting air to or excluding air from said space.

5. A bread raising and warming cabinet comprising a casing, an interior receptacle spaced therefrom, an exit at the top of the casing and communicating with said space, a heating chamber including a source of heat, communicating with said space, at the base of the casing; said heating chamber being provided with an air inlet, a thermostatically controlled valve for said exit, whereby a uniform temperature is maintained within said space.

In testimony whereof I affix my signature in the presence of two witnesses.

WILIE G. ASKEW.

Witnesses:
G. J. MEQUET,
F. L. MILLER.

Copies of this patent may be obtained for five cents each, by addressing the "Commissioner of Patents, Washington, D. C."